(12) United States Patent
Weirauch

(10) Patent No.: US 7,800,988 B2
(45) Date of Patent: Sep. 21, 2010

(54) OPTICAL RECORDING USING SECONDARY TRACKING METHOD

(75) Inventor: Charles R. Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 871 days.

(21) Appl. No.: 11/676,177

(22) Filed: Feb. 16, 2007

(65) Prior Publication Data
US 2008/0198722 A1 Aug. 21, 2008

(51) Int. Cl.
*G11B 7/00* (2006.01)
(52) U.S. Cl. ............... 369/44.27; 369/44.37; 369/53.1
(58) Field of Classification Search ............. 369/94, 369/44.27, 44.26, 44.37, 103, 44.28, 44.29, 369/53.1, 53.22, 47.27
See application file for complete search history.

(56) References Cited

U.S. PATENT DOCUMENTS

| | | | | |
|---|---|---|---|---|
| 6,687,200 | B1 * | 2/2004 | Kobayashi | 369/44.26 |
| 7,088,513 | B2 * | 8/2006 | Tanaka et al. | 359/569 |
| 7,502,297 | B2 * | 3/2009 | Seko et al. | 369/103 |
| 7,545,729 | B2 * | 6/2009 | Yamamoto et al. | 369/275.3 |
| 7,576,900 | B2 * | 8/2009 | Lan et al. | 359/22 |
| 7,626,913 | B2 * | 12/2009 | Usami | 369/103 |
| 2003/0227859 | A1 | 12/2003 | Hirai | |
| 2006/0023582 | A1 | 2/2006 | Maruyama | |
| 2006/0140070 | A1 | 6/2006 | Shiono et al. | |
| 2006/0193220 | A1 | 8/2006 | Iwata et al. | |
| 2006/0250912 | A1 | 11/2006 | Pratt et al. | |

OTHER PUBLICATIONS

PCT International Search Report for Patent Application No. PCT/US2008/053801 (filed Feb. 13, 2008) Report issued Jul. 30, 2008.

* cited by examiner

*Primary Examiner*—Nabil Z Hindi

(57) ABSTRACT

The present invention is embodied in a method for storing computer readable data on a removable storage medium, including using a first wavelength to write data to the removable storage medium, using a second wavelength to maintain radial tracking on the removable storage medium, wherein the second wavelength is shorter than the first wavelength, and maintaining axial tracking on the removable storage medium with at least one of the first wavelength or the second wavelength.

26 Claims, 16 Drawing Sheets

Figure 10B

| B | R | CA | PP | FE |
|---|---|------|------|------|
| 0 | 1 | RED  | RED  | RED  |
| 1 | 0 | BLUE | BLUE | BLUE |
| 1 | 1 | RED  | BLUE | RED  |

Figure 10C

| Disc Type | R/W | LASER POWER | |
|---|---|---|---|
| | | RED | BLUE |
| DVD+R/RW DVD-R/RW | Read | Low | Off |
| DVD+R/RW DVD-R/RW | Write | High | Off |
| HD DVD-R BD-R | Read | Off | Low |
| HD DVD-R BD-R | Write | Off | High |
| Disc 100 | Read | Low | Off |
| Disc 100 | Write | High | Low |

OPTICAL RECORDING USING SECONDARY TRACKING METHOD

BACKGROUND

Some electronic systems include a storage drive that can write and read data on a removable storage medium. Because the storage medium is removable, the data on the storage medium is designed to be compatible with many other types of storage drives. It is desirable to have data that is written on one storage drive be readable by other storage drives. In addition, with copy protected removable storage media, once the media has been recorded, it is desirable to have drives other than those intended to write to the media capable of recognizing the media as read only. Unfortunately, since some of the storage drives intended for reading the media are also capable of writing on recordable media, the storage media may be rejected if it is recognized as copy protected recordable media.

SUMMARY

The present invention is embodied in a method for storing computer readable data on a removable storage medium, including using a first wavelength to write data to the removable storage medium, using a second wavelength to maintain radial tracking on the removable storage medium, wherein the second wavelength is shorter than the first wavelength, and maintaining axial tracking on the removable storage medium with at least one of the first wavelength or the second wavelength.

BRIEF DESCRIPTION OF THE DRAWINGS

The present invention can be further understood by reference to the following description and attached drawings that illustrate the embodiment(s). Other features and advantages will be apparent from the following detailed description of the embodiment(s), taken in conjunction with the accompanying drawings, which illustrate, by way of example, the principles of the invention.

FIGS. 10A, 10B and 10C represent a schematic view of an example embodiment of the interface circuitry for a drive and the signal selections according to this invention.

DETAILED DESCRIPTION OF THE EMBODIMENTS

In the following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Figure 1A:
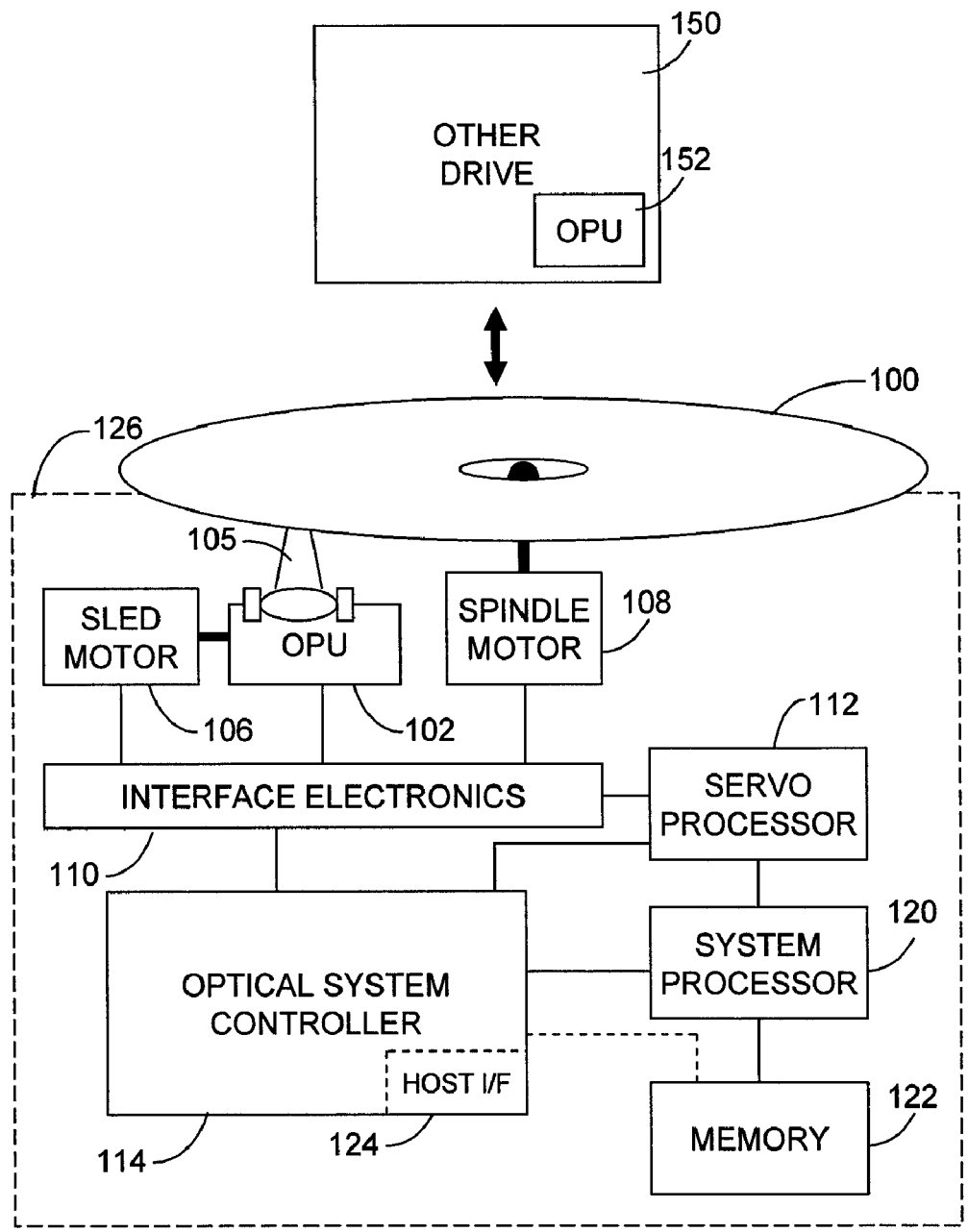
FIG. 1A is a block diagram of one embodiment of a drive mechanism capable of reading and/or recording on optical medium.
Figure 1B:
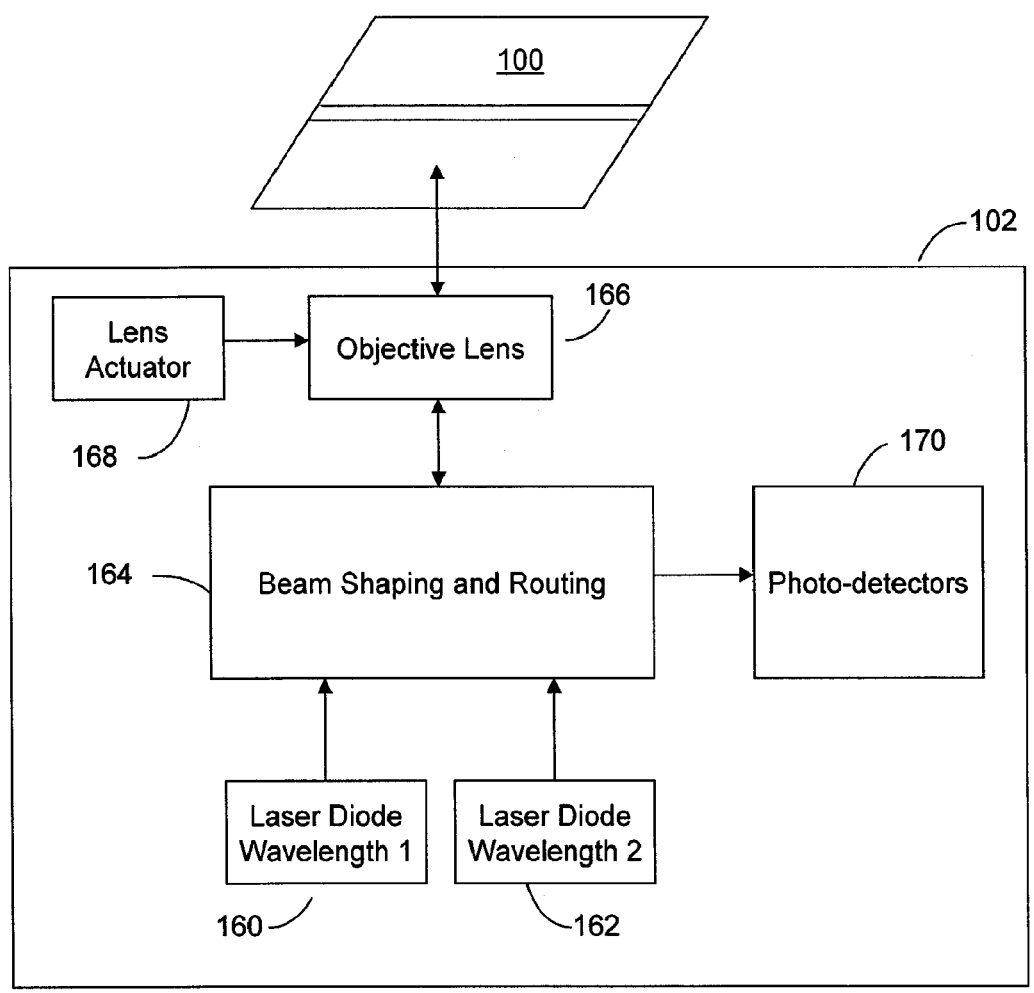
FIG. 1B is a high level block diagram of one embodiment of an optical pickup.

FIG. 1A is a block diagram of one embodiment of a drive mechanism capable of reading and/or recording on optical medium and FIG. 1B is a high level block diagram of one embodiment of an optical pickup unit. In one embodiment, the system includes a removable optical disc 100 as the optical medium and a drive 126. Drive 126 further includes a spindle motor 108 connected to a clamping system for the removable optical disc 100. Information is read from and/or written on the disc 100 using an optical pickup unit (OPU 102).

The OPU 102 includes one or more lenses 166 (FIG. 1B) and one or more electro-mechanical actuators 168 for moving the one or more objective lens 166 in radial and axial directions with respect to each recording layer of disc 100. Additionally, OPU 102 includes at least two laser diodes 160, 162 of two different wavelengths for individually reading or writing standard optical media, such as DVD, Blu-ray and HD DVD, or collectively for writing the disc 100. The OPU 102 also includes additional optical elements 164 to shape, polarize, split or combine the laser light beams emitted from the laser diodes 160, 162. The OPU 102 also includes photo-detectors 170 for converting the reflected light into electrical signals for reading data and for creating necessary tracking signals to keep the laser spot focus and following the tracks on optical discs. In one embodiment, the OPU contains multiple sets of photo-detectors 170, actuators 168, objective lenses 166, and additional optical elements 164 for each wavelength laser diode 160 and 162 or may share some, all or part of each. OPU 102 is mechanically attached to a sled motor 106, which is configured to move OPU 102 across a usable radius of the optical disc 100.

Interface electronics 110 (of FIG. 1A) are used to condition and combine signals from the photo-detectors in OPU 102 to create radial and focal signals for reading and writing and for creating a signal for reading data. Additionally, the interface electronics 110 control the laser diodes 160 and 162 in the OPU 102 during reading and writing. The interface electronics also routes and conditions the signals from the photo-detectors 170 according to the type of disc in the drive 126. The interface electronics 110 also condition signals for the sled motor 106 and the spindle motor 108. Next, a servo processor 112 includes focus and tracking signals to adjust the lens 166 by the electro-mechanical actuator 168 in OPU 102. The focusing and tracking by the servo processor 112 can be done directly or using the interface electronics 110 to maintain radial and axial tracking during reading and writing.

The signals from photo-detectors 170 can also be used to control the velocity of the spindle motor 108 while writing.

Drive 126 uses laser optics with at least two wavelengths to record data onto the disc 100. Data marks and spaces are created on a layer of the disc 100 by modulating a first high power laser diode with a first wavelength, while controlling the location of the marks with a second laser diode with a second wavelength that is different than the first wavelength. In one embodiment, the drive 126 writes the marks using a high power red laser with a wavelength being one of a range between 630-680 nanometers. However, the radial location of the recording spot is controlled using a low power blue or blue-violet laser diode with a wavelength being one of a range between 400-420 nanometers.

In one embodiment, modified Blu-Ray and/or HD DVD format drive technology would implement the present invention to allow recording with one laser diode, while signals for controlling the tracking are generated by one of the other laser diodes with a wavelength at a lower power. Interface electronics will then allow the same drive to read or write existing formats such as DVD-R, DVD+R, CD-R, Blu-ray or HD DVD, as well as the disc of one embodiment. In this embodiment, the disc would be more compatible when read back by other DVD recorders or playback devices. The disc of this embodiment would also enable using recording dyes and materials common to normal DVD recording leading to lower cost media than discs designed for recording by one wavelength to be read back by another wavelength.

An optical system controller 114 decodes data from the photo-detectors in OPU 102 and conditioned by interface electronics 110. Optical system controller 114 also encodes data and modulates the laser power in OPU 102 through interface electronics 110. The optical system controller 114 uses the read data to adjust the spindle motor 108 velocity if the servo processor 110 does not perform that function during data reading. In addition, the optical system controller 114 includes a host interface 124 for communicating with a host device. Host interface 124 may be a proprietary interface, or may be an industry-standard interface, such as a Serial Advanced Technology Attachment (SATA) interface, a Parallel Advanced Technology Attachment (PATA) interface (sometimes embodied as an "IDE" or "EIDE" interface), a Universal Serial Bus (USB) interface, an IEEE 1394 serial interface, an IEEE 1284 parallel interface, or another kind of standard interface. The components in the system are controlled by a processor 120 running code from memory 122.

This allows drive 126 to be configured to enable other drive 150 with different laser optics to read data written to disc 100 by drive 126. For example, both drive 126 and drive 150 use a first laser diode with a first wavelength for writing and reading data from disc 100. However, drive 150 includes an OPU unit 152 that uses a laser diode with the same wavelength for both reading data and tracking that is different than the second wavelength used by drive 126 for tracking. The first wavelength of drive 126 and drive 150 can be created with a red laser that has a wavelength of one of from 630 to 680 nanometers and the second wavelength for tracking of drive 126 can be created with a blue violet laser that has a wavelength of one of from 400 to 420 nanometers. The geometry of disc 100 will cause drives 126 and 150 to generate different radial tracking servo signals, while the recorded disc will generate tracking signals that allow playback of disc 100 in drive 150.

Specifically, in one embodiment, discs are recorded using a red laser (for example 660 nm) for creating the data marks and a blue-violet laser (for example, 405 nm) for tracking through a 0.65 numerical aperture (NA) lens that creates marks comparable to those written by a red laser (for example, 660 nm) with a 0.65 NA lens. The blue-violet wavelength enables a groove depth that has a low push-pull signal when read by a red laser, but a strong push-pull signal when read by a blue laser. As such, when drives with a red laser examine the push-pull signal, a weak push-pull signal will be exhibited. This allows the drives with the red lasers to read the disc since the weak push-pull signal will be similar in amplitude to the push-pull signal that would be exhibited by the lands and pits of a stamped, read-only disc.

FIGS. 1A and 1B show a sample optical disc system in accordance with one embodiment of the invention, but other embodiments are possible. The functions described may be partitioned into different blocks. For example, the servo processor 112 may be combined into optical system controller 114, or the system processor 120 and memory 122 can be combined into a single integrated circuit. Also, the various functions may be distributed across various locations, for example, part of the interface electronics 110 may be located and move with the OPU 102 by sled motor 106, while other parts of the interface electronics 110 may exist in other physical locations that are fixed in location. In addition, each element may represent multiple similar elements. For example, in one embodiment, lens 166 represents one lens, while in another embodiment there may be a separate lens 166 for each wavelength. Further, beam 105 may represent either a red or blue-violet laser beam.

Figure 2A:
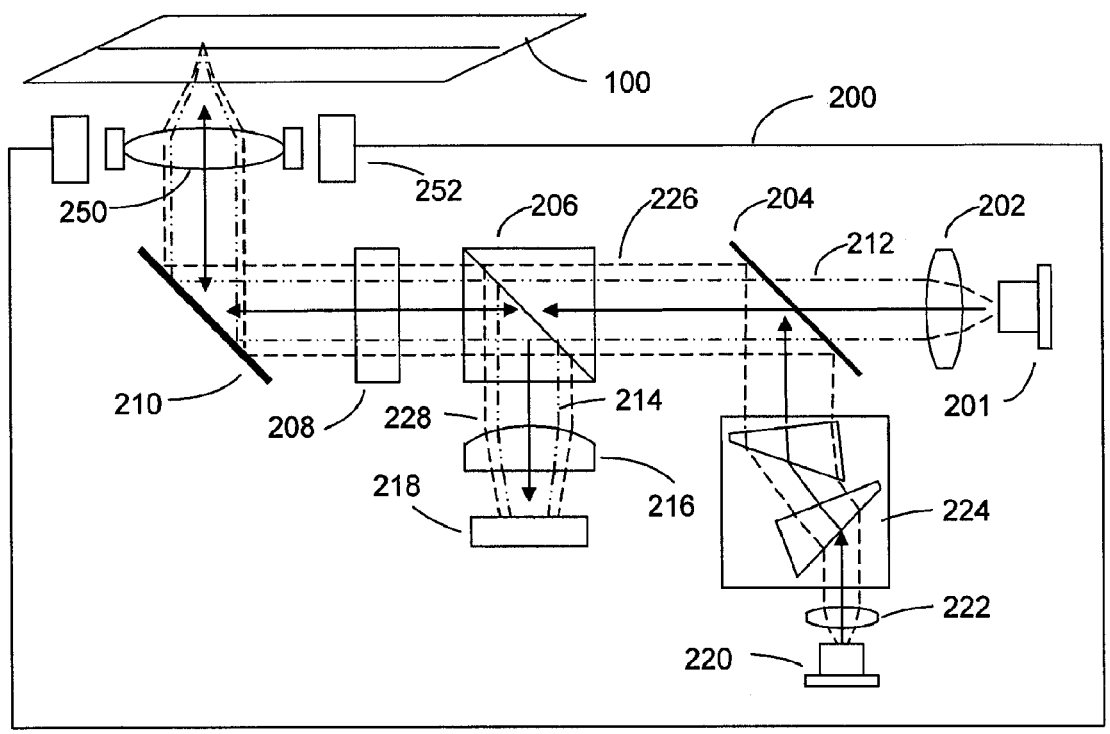
FIGS. 2A, 2B and 2C represent schematic views of example embodiment of optics containing a single objective lens for the two wavelengths.

FIG. 2A is an example schematic illustration of an optical pickup unit (OPU) 200 that can be used in one embodiment for reading or writing optical media. The OPU 200 comprises two different light paths for the wavelengths of two different laser diodes. The light path for the first wavelength uses a laser diode 201 for emitting coherent polarized energy, a collimating lens and focusing lens 202, a dichroic mirror 204, a polarizing beam splitter 206, a quarter-wave plate 208, a mirror 210, an objective lens 250, electro-mechanical elements 252 coupled to the objective lens 250, a cylindrical lens 216, and four quadrant photo-detectors 218. The light path for the second wavelength uses a laser diode 220 for emitting coherent polarized energy at a different wavelength than laser diode 201, a collimating lens and focusing lens 222, a pair of anomorphic beam shaping prisms 224, a dichroic mirror 204, a polarizing beam splitter 206, a quarter-wave plate 208, a mirror 210, an objective lens 250, electro-mechanical elements 252 coupled to the objective lens 252, a cylindrical lens 216, and four quadrant photo-detectors 218.

In operation of one embodiment, coherent laser light is emitted from each laser diode 201, 220 and can be collected and more collimated by the beam shaping lens 202, 222. In addition, if a beam needs to be made more circular, one axis can be expanded by using an anomorphic prism pair 224. Emitted light beam 212, with a first wavelength, and emitted light beam 226 with a second wavelength, can be mixed into the same light path by using a dichroic mirror 204 that reflects light of one wavelength and passes and transmits light of another wavelength. The coherent light is linearly polarized and the polarization is oriented so as to lose little or no energy when passing through the polarizing beam splitter 206.

The polarization orientation is accomplished during the manufacture of the OPU 200 by having each laser diode 201, 220 rotated to a suitable angle. The light then passes through a quarter-wave plate 208, which converts the light from being linearly polarized to circularly polarized. Quarter-wave plates can be manufactured to support either a wide range of wavelengths or more simply for two distinct wavelengths. The light beam is then reflected by a mirror 210 through the objective lens 250, which focuses the mostly collimated beam to the recording layer of the optical disc. The laser light that is reflected back from the optical media for both wavelengths remains circularly polarized.

However, in the opposite direction, the laser light is collected through the objective lens 250, reflected by the mirror 210, and converted back to linearly polarization light by the quarter-wave plate 208. The polarization of the light is rotated by 90 degrees so that the light from the two different wavelengths, light 214 and light 228, are reflected by the polarizing beam splitter 206 and pass through the cylindrical lens 216 and onto the four quadrant photo-detectors 218, where the light intensity is converted to electrical signals. The cylindrical lens causes the light 214 and light 228 to converge along one axis faster than along other axes. The electro-mechanical elements 252 receive electrical signals causing the objective lens 250 to move axially to maintain focus. The objective lens also moves radially to allow the focused spot to move across the tracks or to maintain radial tracking.

The electrical signals generated by the photo-detectors will be caused by the light 214 and 228 from the two different wavelengths. The net signal is the superposition of the two signals caused by each individual wavelength. A disc designed to have a push-pull signal X for one wavelength and push-pull signal Y for the second wavelength will have a net push-pull signal X+Y for radial tracking. The two different wavelengths will varyingly interfere with each other; however the frequency response of the photo-detectors will eliminate any higher frequency aspects. Also, signal filtering in the interface electronics can eliminate lower frequency beating.

Figure 2B:
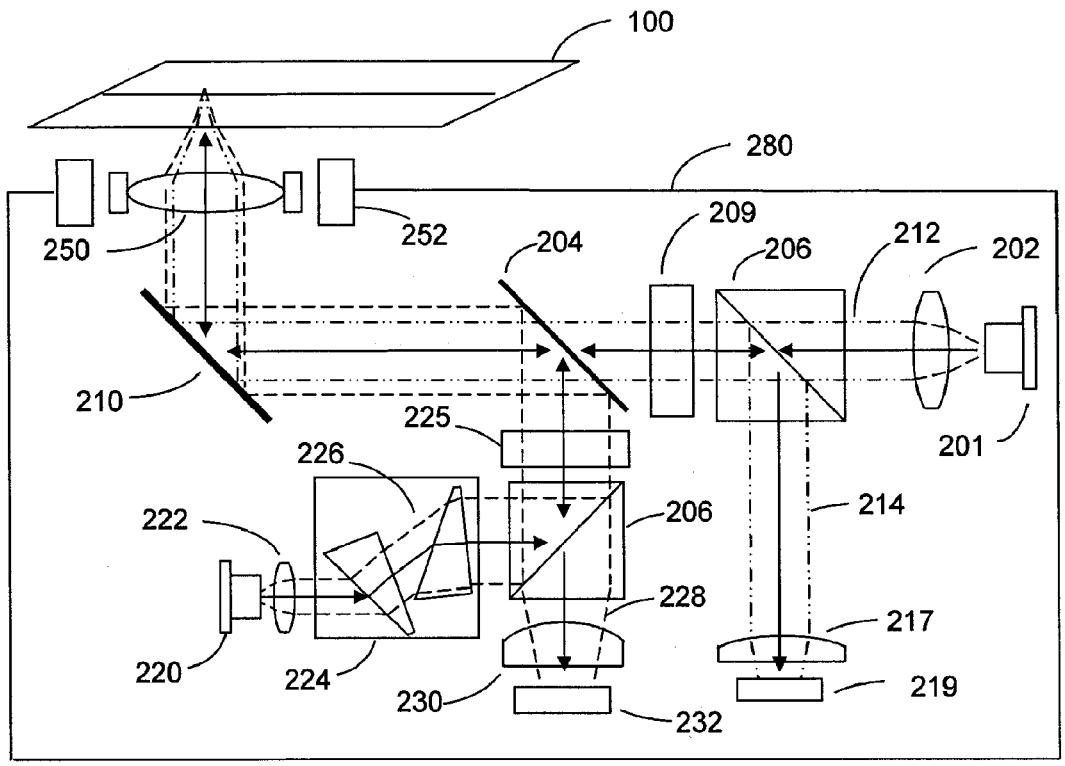
Figure 2C:
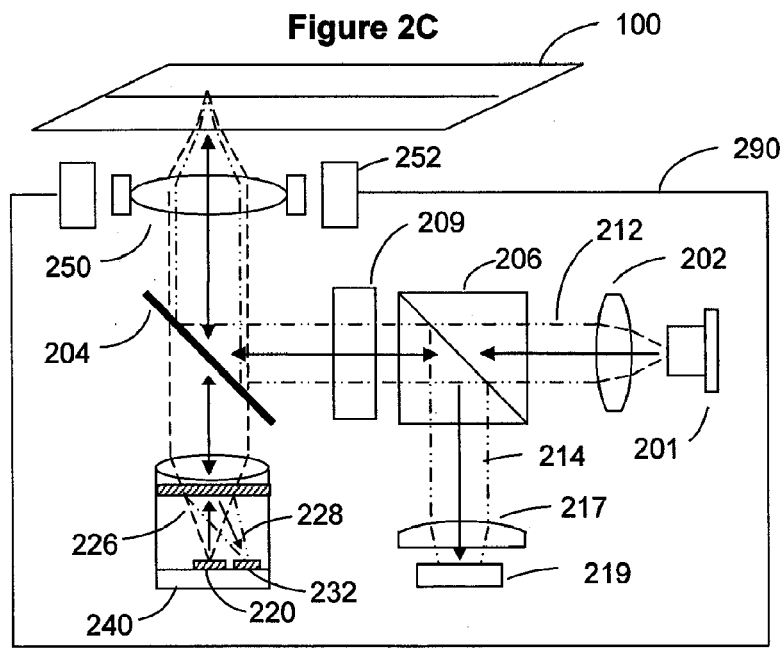

Interference caused by the two wavelengths can be eliminated in the embodiments shown in FIGS. 2B and 2C, which represent example embodiments where the light from each wavelength are incident on separate photo-detectors 219, 232. In OPU 280 of FIG. 2B, the collimated and polarized light from laser diode 202 is converted to mostly collimated and circularly polarized light. This is accomplished with a wavelength sensitive quarter-wave plate 209 before the light is combined with mostly collimated and circularly polarized light by quarter wavelength plate 225 from the second wavelength of laser diode 220. The dichroic mirror is polarization insensitive for any wavelengths of transmitted light.

The first wavelength of the emitted light 212 is used for writing the media and the reflected light 214 is astigmatic focused through cylindrical lens 217 to photo-detectors 219 for the first wavelength. The electrical signals generated by the photo-detectors 219 can be used for monitoring recording and maintaining axial tracking while writing to the disc 100. The second wavelength of emitted light 226 is used for radial tracking and reading information that is available from the radial push-pull signal. The reflected light 228 is focused onto photo-detectors 232 to generate a push-pull signal to maintain correct radial positioning. The astigmatic focused signal caused by cylindrical lens 230 also allows the second wavelength of emitted light 226 to be used for axial tracking while writing with the first wavelength of emitted light 212.

Additionally, when reading or recording standard formats based on the first wavelength and optics for laser diode 201, laser diode 220 is turned off and all data and tracking signals are generated from photo-detectors 219. Similarly, when reading or recording standard formats based on the wavelength and optics for laser diode 220, laser diode 201 is not turned on and all data and tracking signals are generated from photo-detectors 232. In this embodiment, the interface electronics 110 of FIG. 1A select the appropriate signal paths based on the disc 100 in drive 126. For example, a combination DVD writer (laser diode 201) with HD DVD writer (laser diode 220) and OPU 280, selects all signals from photo-detectors 219 for a blank or recorded DVD−R or DVD+R or DVD read-only disc, all signals from photo-detectors 232 for a HD DVD-R or HD DVD-ROM disc, or a combination of signals from photo-detectors 219 and 232 for a blank or partially recorded disc 100 of OPU 280

In one embodiment, the drive 126 of FIG. 1A reads and writes at the first wavelength and only reads with the second wavelength. In the OPU 290 in FIG. 2C, the second wavelength is created from a read-only integrated optical module 240. Size, weight and cost can be reduced with integrated optical modules that include many components from a discrete design. For example, the integrated optical module 240 includes a laser diode 220 that emits a different wavelength than laser diode 201 and includes photo-detectors 232, a holographic grating and optical elements that allow the emitted light beam 226 to pass through a bichroic mirror 204 and be focused to, and reflected from, the recording layer of the disc 100. On the return path, the reflected light beam 228 is focused and diffracted to the photo-detectors contained in the integrated optical module 240. The optical path of the emitted light beam 212 from laser diode 201 operates similarly to the optical path of FIG. 2B, except that the dichroic mirror 204 is designed to reflect the light eliminating the need for the mirror 210 of FIG. 2B. This example embodiment allows for the design of lower cost drives capable of reading HD DVD-R or HD DVD-ROM and reading or writing recordable DVDs, such as DVD−R or DVD+R, and a disc 100.

Figure 3A:
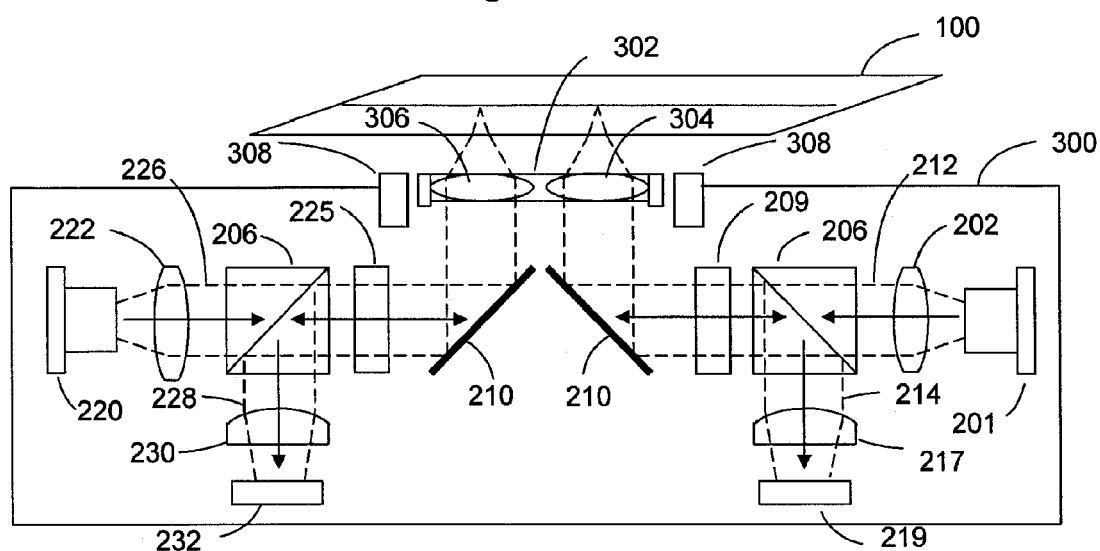
FIGS. 3A, 3B, and 3C represent schematic views of example embodiment of optics containing individual objective lens for the two wavelengths.
Figure 3B:
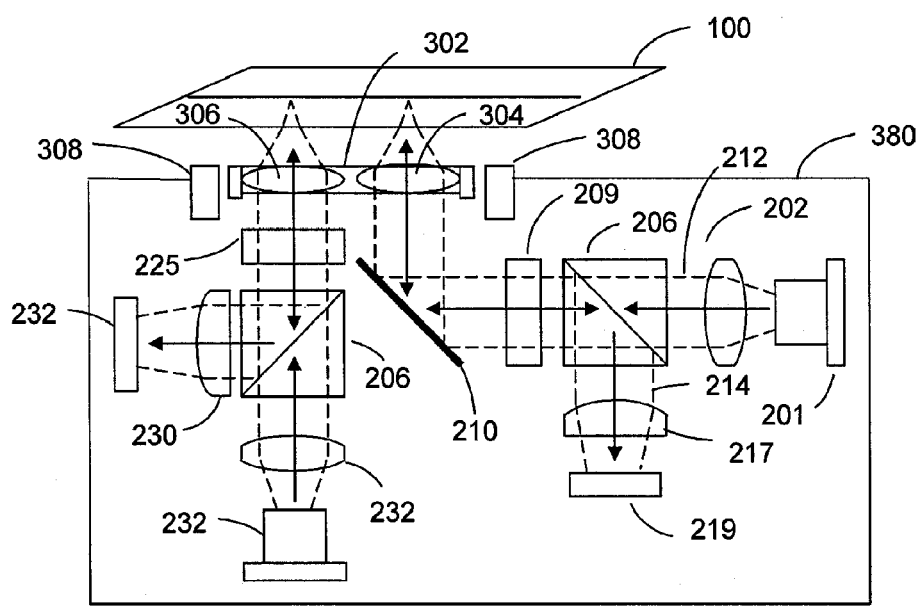
Figure 3C:
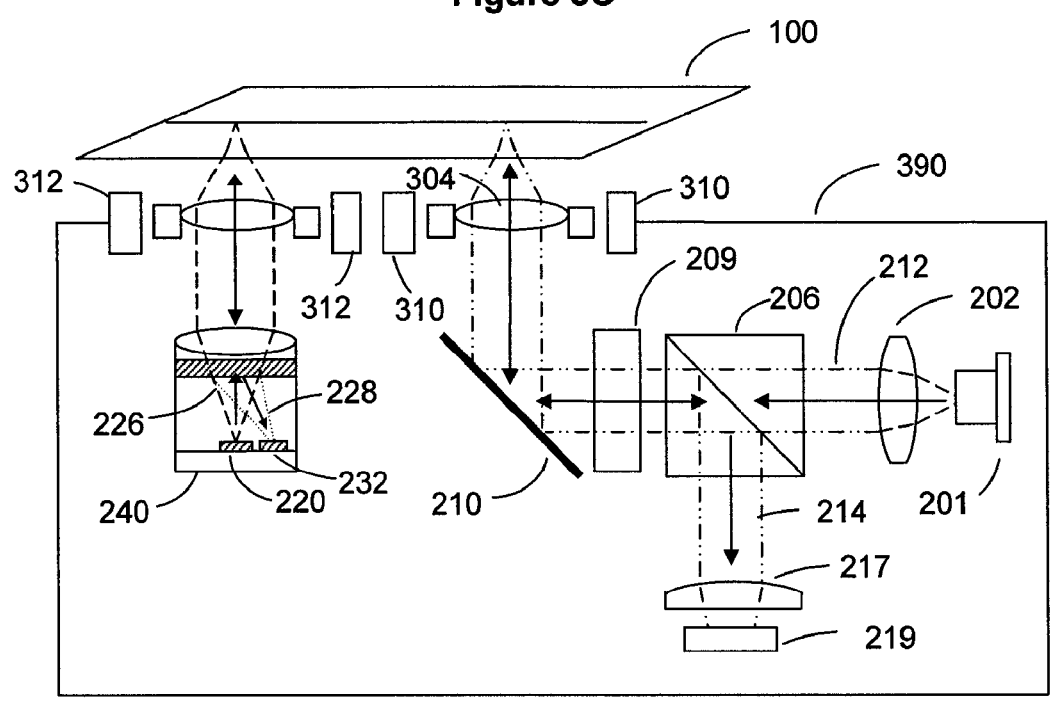

The example embodiments in FIGS. 2A, 2B and 2C share a single objective lens. A dual lens system can also be made to work in a similar fashion. FIGS. 3A, 3B, and 3C represent example embodiments with separate objective lenses for the two wavelengths. The basic operation is the same as the embodiments of FIG. 2A, except that the two light paths remain completely separate and a dichroic mirror is not used. In FIGS. 3A and 3B, the emitted laser light 212 from laser diode 201 is focused through objective lens 304 and the reflected light 214 is astigmatic focused onto photo-detectors 219. The emitted laser light 226 from laser diode 220 is eventually focused through objective lens 306. The reflected laser light 228 is then astigmatic focused onto photo-detectors 232.

In one embodiment (FIG. 3A), both light paths are shown utilizing only focus and collimating lenses 202 and 222. If the intensity profile of either laser diode 201 or 220 requires additional beam shaping, then additional beam shaping elements, such as the anomorphic prism pair 224 of FIG. 2A or 2B, can be inserted into the appropriate light path. The two objective lenses 304 and 306 are captured in the same lens carrier 302 and moved together by dual lens actuator 308. The OPU 300 of FIG. 3A utilizes two mirrors 210 to turn the light beams from both laser diodes 201, 220. The mirrors 210 are included to allow lower profile designs. If space is not an issue or optics are sufficiently small, then a beam turning mirror is not necessary as in the example embodiment of the OPU 380 of FIG. 3B where only one of the two light paths includes a mirror 210. Another embodiment could similarly have no mirror 210 for either light path.

FIG. 3C represents a schematic view of an OPU 390 of another example embodiment that incorporates separate objective lens actuators 310 and 312 for the objective lenses 304 and 306 respectively for the two wavelengths of light. The signals from photo-detectors 219 and from the photo-detectors in the integrated optical unit 240 are used by the servo processing function 112 of FIG. 1A to cause the individual actuators 310 and 312 to move the individual objective lenses 304 and 306. The servo processing function 112 of FIG. 1A causes the actuators to move together radially with respect to the tracks on disc 100 of FIG. 1A when recording to the disc 100. When reading or writing a disc of another standard format, such as DVD+R or HD DVD, only the laser diode and actuators are used for the specific format.

Figure 4:
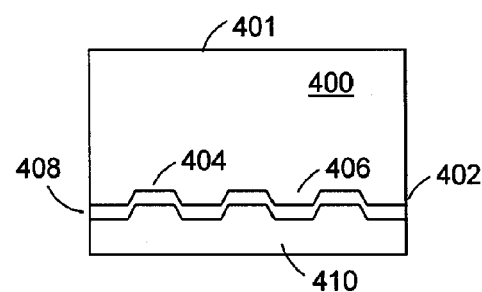
FIG. 4 shows a cross section of an example of optical storage medium of one embodiment containing a spiral groove structure for recording.

FIG. 4 depicts a schematic layout of a cross section of one embodiment of the storage medium disc 100 of FIG. 1A. The disc 100 includes a cover layer 400 with an entrance surface 401 and a land and groove structure 402 containing grooves 404 located closest to the entrance surface 401 separated by lands 406. An appropriate grove structure 402 is created on substrate 410 so that a weak push-pull signal exists from disc 100 of FIG. 1A before or after writing with a first wavelength from laser diode 201 (of FIG. 2 or 3), while a strong push-pull signal exists when the disc 100 is scanned by using the second wavelength from laser diode 220 (of FIG. 2 or 3) before or during writing. Additionally, the recorded disc 100 has a low push-pull signal when inserted into another drive, such as drive 150 of FIG. 1A, using the first laser wavelength of drive 126.

The groove 404 is oriented in a spiral fashion over all or part of the radius of the disc 100. A recording layer stack 408 exists on the land and groove structure 402. The recording layer stack 408 can consist of multiple layers that allow recording or rewriting and reflecting of different amounts of light depending on the presence of a recorded mark or a space. Further, the recording layer stack 408 can have low sensitivity to the second wavelength, making the data on the recorded disc difficult to read with the second wavelength. Additionally, there can be multiple recordable layers such that the laser spots are operating on the same layer at the time of recording of each layer.

Figure 5A:
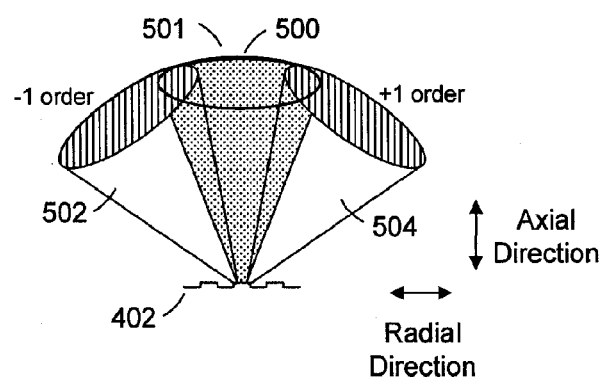
FIGS. 5A, 5B, 5C, 5D and 5E illustrate one embodiment of the grooved structure with the reflected light and the light intensity caused by the reflected light at the drive mechanism's photo-detectors.

FIGS. 5A, 5B, 5C, 5D and 5E are various diagrams depicting the grooved structure with the reflected light and the light intensity caused by the reflected light at the drive mechanism's photo-detectors of one embodiment. Referring to FIG. 5A, when focused optical light 500 from objective lens 250 of FIG. 2 is reflected by the groove structure 402 of FIG. 4, diffraction also occurs creating additional multiple lobes or orders of reflected light 502 (−1 order) and 504 (+1 order). The reflected light by this diffraction is in addition to the main reflected lobe 501. Additional orders are also reflected, but are not typically captured by the objective lens 250 of FIG. 2.

Figure 5B:
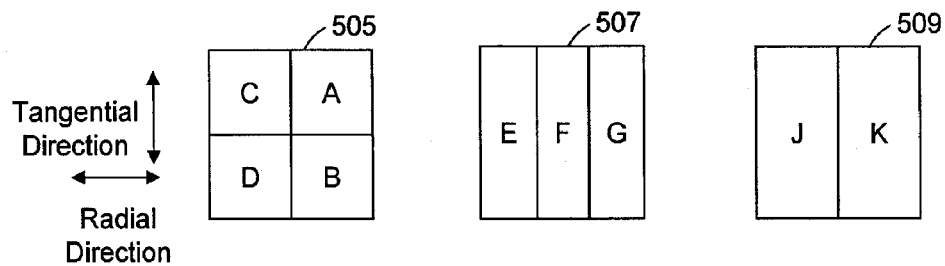

FIG. 5B depicts various photo-detector orientations capable of generating a push-pull signal from the reflected light lobes 500, 502, and 504. One embodiment uses a four quadrant photo-detector 505. The four quadrant photo-detector 505 also generates focus error signals for astigmatic focus methods. Another embodiment uses a three photo-detector 507 with the sections oriented in the tangential direction. Yet another embodiment uses a split photo-detector 509. The basic operation for deriving a push pull signal is similar for all three embodiments.

Figure 5C:
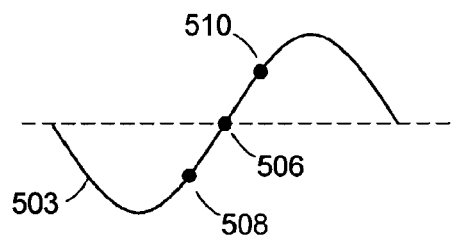

Incident at the four quadrant photo-detector 505 of FIG. 5B, the +1 and −1 order reflected lobes (504 and 502, respectively) of FIG. 5A constructively or destructively interfere with the main reflected lobe 501. The amount of interference is dependent on the amount and phase of the coherent light of the +1 and −1 order lobes with respect to the amount and phase of the coherent light of the main reflected lobe 501. The intensity of the light on the photo-detectors 505 of FIG. 5B of the in-track case 506 of FIG. 5C will result in the +1 and −1 order phases of lobes 504 and 502 to equally impact the main lobe. The resulting signal 503 from the photo-detectors 505 of FIG. 5B are shown in FIG. 5C as the spot moves from on land to an adjacent land with the center of the track being the groove.

Figure 5D:
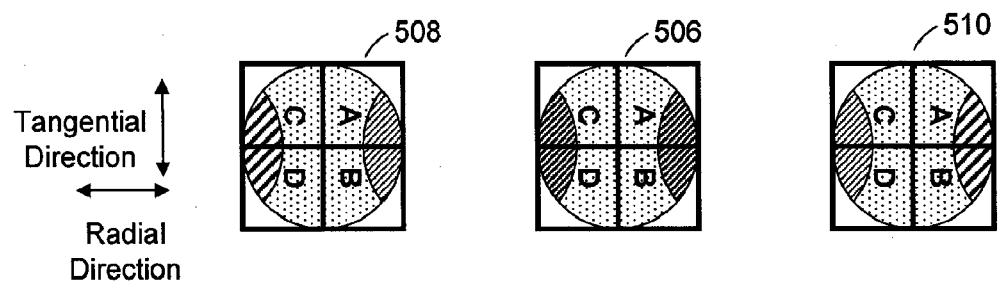

Referring to FIG. 5D, which shows a top view of FIG. 5A with the four quadrants, for the off-track cases 508 and 510, the +1 and −1 orders for lobes 504 and 502 have different phases with respect to each other according to the amount and direction of being off-track. The amount of phase difference between the main reflected signal 501 and the +1 and −1 order lobes 504 and 502 incident on the detector 505 of FIG. 5B is determined by an embodiment of the groove geometry 402 of FIG. 4, which has a strong push pull signal for a first wavelength and a weak push-pull signal for a second wavelength. Thus, the disc 100 of FIG. 1A that was written with a strong push-pull signal with the first wavelength also exhibits a weak push-pull signal when scanned by another drive 150 of FIG. 1A that uses a second wavelength. In one embodiment, a weak push-pull signal is a signal less than 15% of a predetermined amount and a strong push-pull signal is a signal greater than 20% of the predetermined amount before recording. The push-pull signal may exceed these percentages after recording.

Figure 5E:
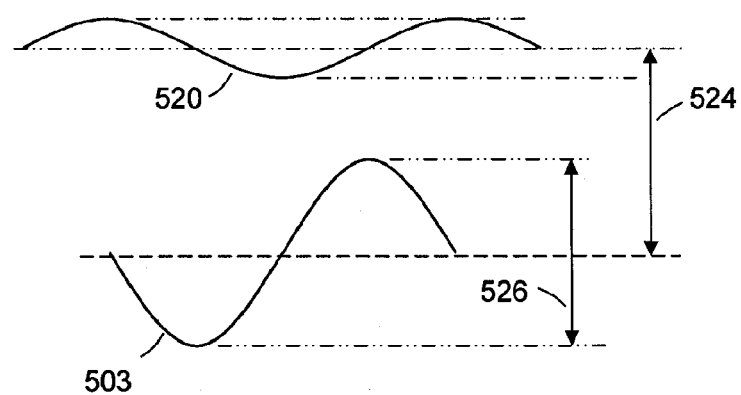

FIG. 5E illustrates the signals caused by the reflected light from the track in one embodiment. Values used for specifying the push-pull amplitude are calculated as a percentage of the push-pull amplitude 526 to the average total signal 524 or simply 526/524. The average total signal amplitude 524 is the average of signal 520 generated by summing all four quadrants of the photo-detector. The average signal 424 is $[(I_A+I_B+I_C+I_D)_{MIN}+[(I_A+I_B+I_C+I_D)_{MAX}]/2$. The amplitude 526 from the push-pull signal 506 from the Push-Pull value is calculated as:

$$PP = \frac{[(I_A + I_B + I_C + I_D)_{MIN} + (I_A + I_B + I_C + I_D)_{MAX}]/2}{[(I_A + I_B) - (I_C + I_D)]_{MAX} - [(I_A + I_B) - (I_C + I_D)]_{MIN}}$$

Figure 6:
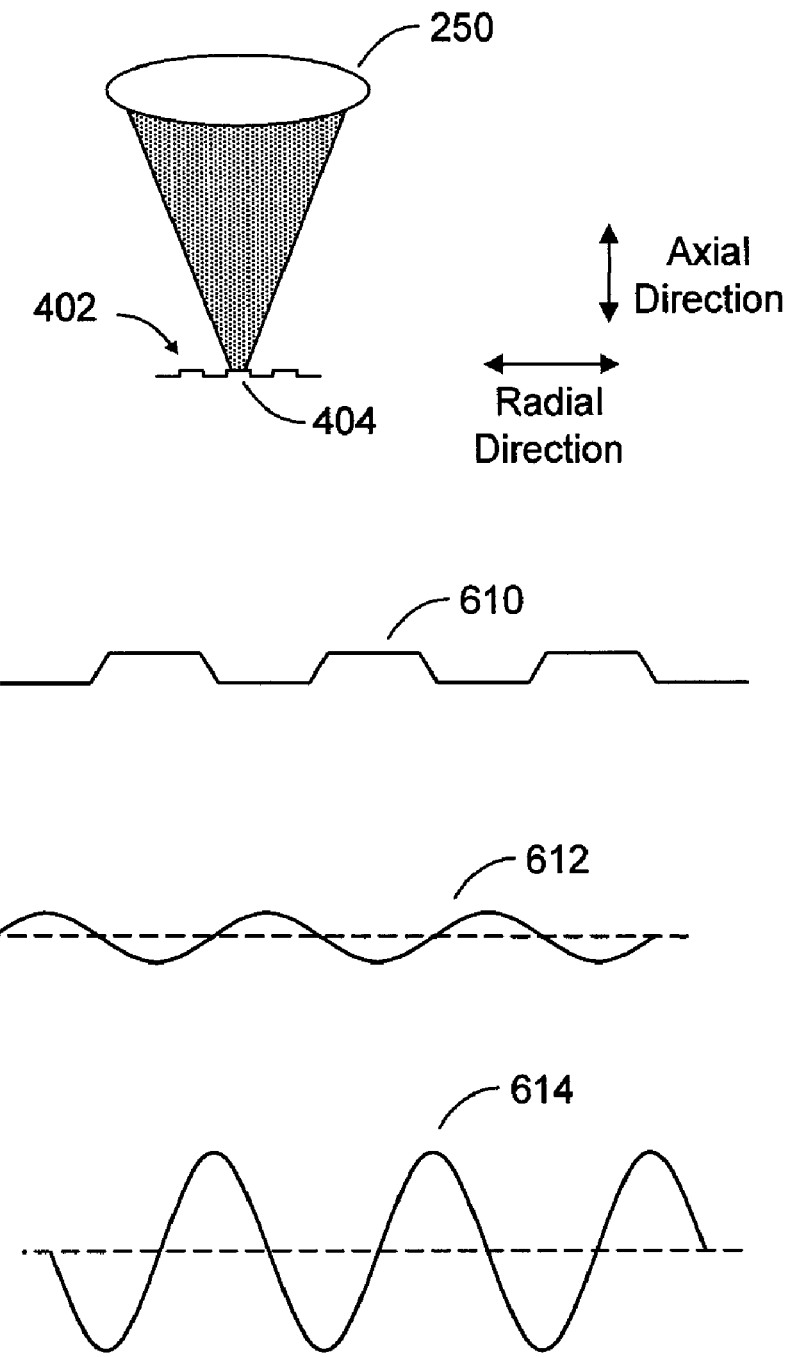
FIG. 6 shows a cross section portion of one embodiment of a storage medium and the push-pull signals in which the groove depths are optimized for writing with a longer wavelength and radial tracking with a shorter wavelength.

FIG. 6 illustrates the push-pull signals of one embodiment as the objective lens 250 radially scans across grooves 404 of FIG. 4. Referring to FIG. 4 along with FIG. 6, the radial scan occurs for two different wavelength laser diodes on land and groove structures 402 that were optimized for the second wavelength from laser diode 220 of FIGS. 2 and 3. The groove depth is optimized based on the wavelength of the laser diode used for reading and tracking the groove. The resulting push-pull signal generated by each wavelength will result in different amplitudes for each wavelength. One embodiment of the invention utilizes a groove structure with a shallow depth 610 in the land and groove structure 402 that produces a weak push-pull signal 612 when using a first range of longer wavelengths laser diodes, such as laser diode 201 from FIGS. 2 and 3, and a strong push-pull signal 614 when using a second range of shorter wavelength diodes, such as laser diode 220 from FIG. 2 and FIG. 3.

Figure 7:
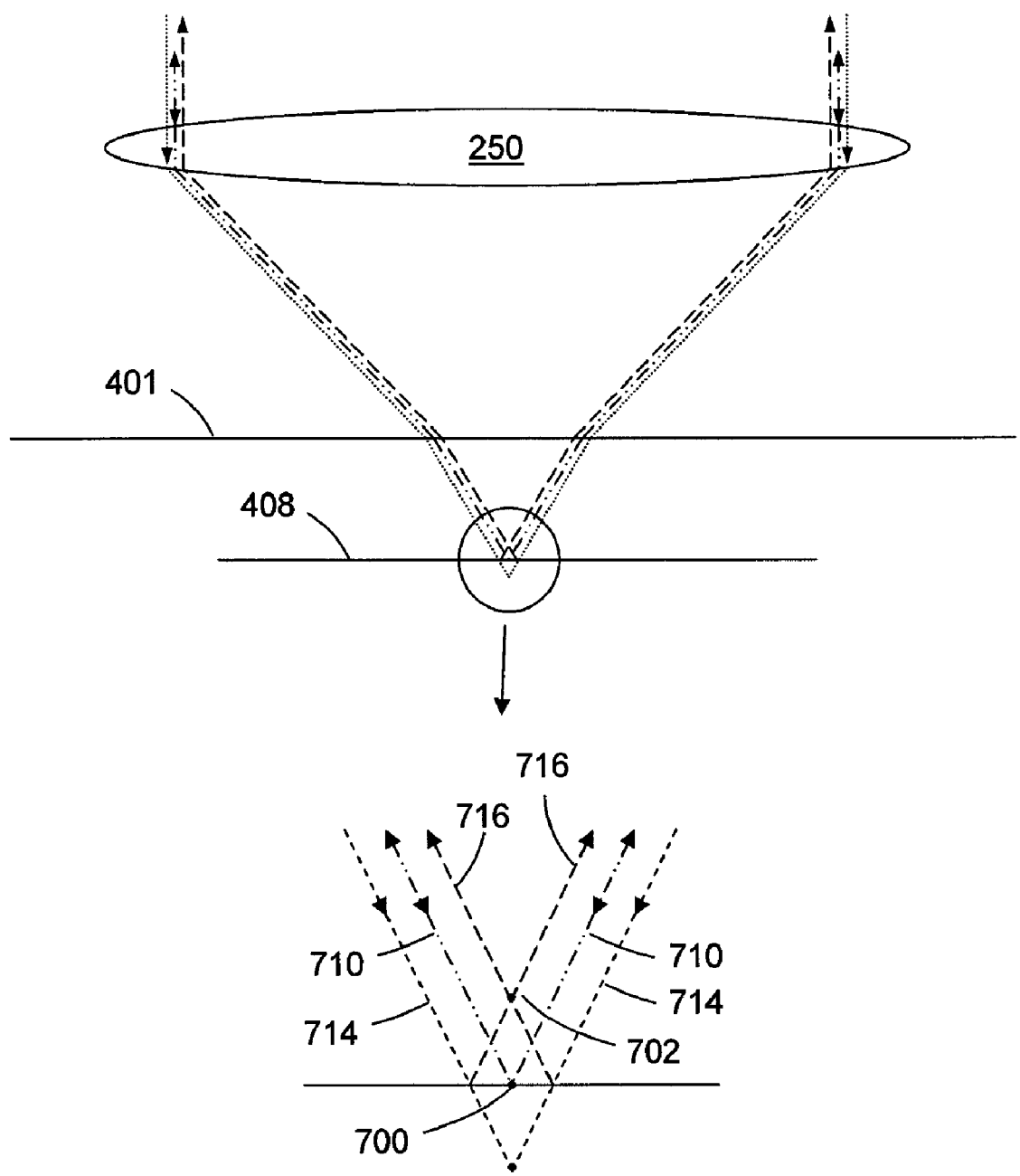
FIG. 7 illustrates the impact on the focus point for the two wavelengths through a single lens optical pickup unit.

Referring back to FIG. 2 along with FIG. 7, in one embodiment, the focus point 702 for the second wavelength from laser diode 220 occurs at a different point axially from the focused spot 700 from the first wavelength from laser diode 201. Optimal recording occurs with the focused spot 700 from laser diode 201 since that is the wavelength used to create the marks and spaces in the media. The radial tracking signals from the second wavelength will not be impacted since the push-pull signal is the difference between the two halves of the photo-detectors. Ray tracings 710 illustrate the emitted and reflected first wavelength of light, while ray tracings 714 and 716 represent the emitted and reflected second wavelength of light respectively.

Figure 8A:
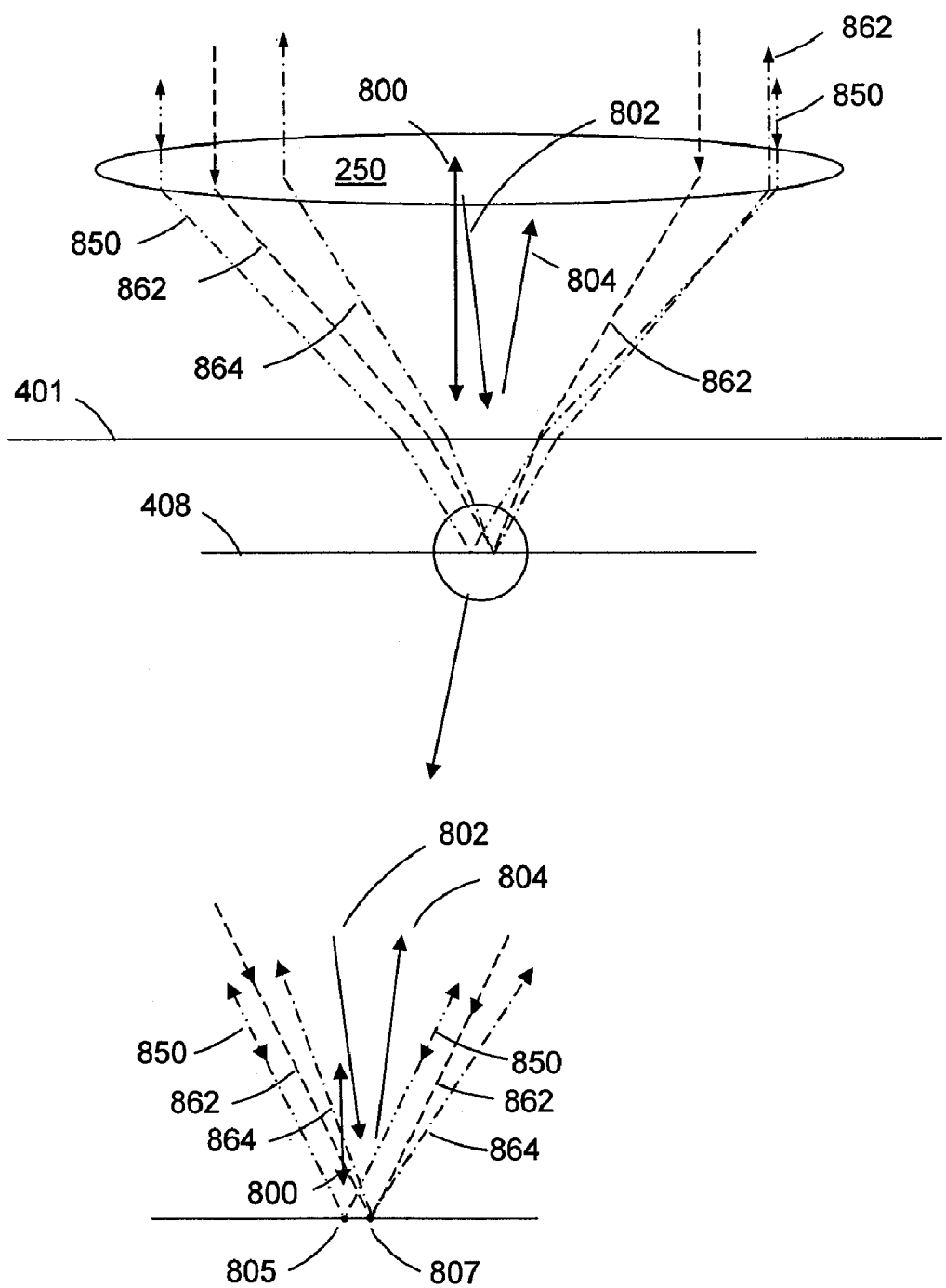
FIGS. 8A, 8B, and 8C illustrates various embodiments of the laser beam spots incident at the recording surface of the disc for the two different wavelengths.
Figure 8B:
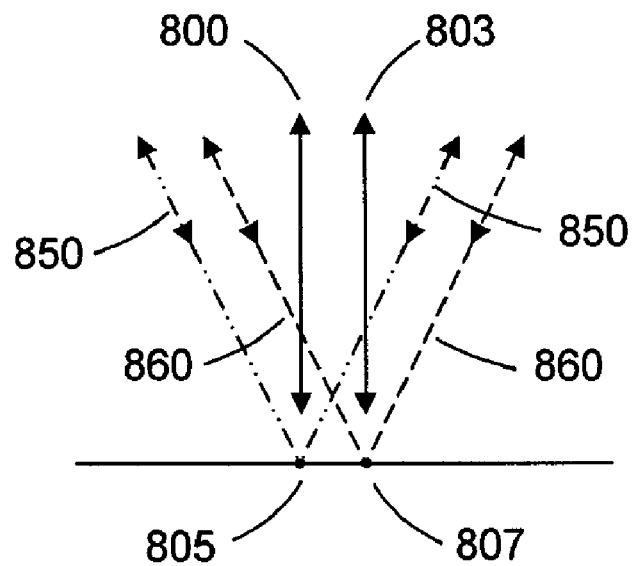
Figure 8C:
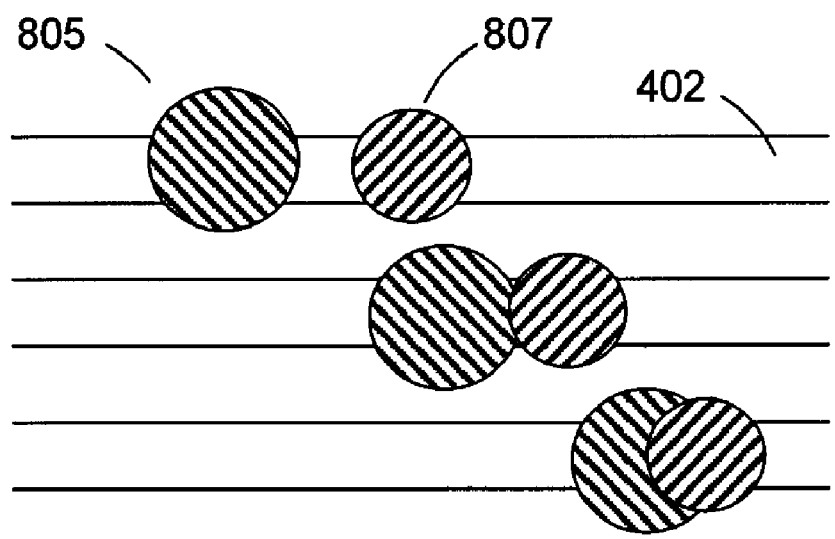

FIGS. 8A, 8B, and 8C illustrate different embodiments to generate the laser spots on the same layer for the two different wavelengths generated by the laser diodes 201 and 220 from FIG. 2. In FIG. 8A, the axis 800 of the emitted and reflected light beam as shown by ray tracings 850 from the first wavelength emitted from laser diode 201 of FIG. 2 is normally incident on the recording layer. This occurs while the axis 802 of the emitted light beam as shown by ray tracings 862 from the second wavelength emitted from laser diode 220 of FIG. 2 is incident on the recording layer 408 at an angle. This causes the second wavelength spot to reduce or eliminate the overlap of the focused laser spots from the first wavelength 805 and the second wavelength 807. The axis 804 of the reflected light beam as shown by ray tracings 864 will also be at an angle. The resulting spot from the angle will have some coma aberrations that have little impact on the radial tracking signals for the second wavelength. Either laser spot can lead the other, however, in one embodiment, the low power second wavelength spot 807 leads the high power first wavelength spot 805 to minimize noise from the writing process from impacting the tracking signal.

Figure 9A:
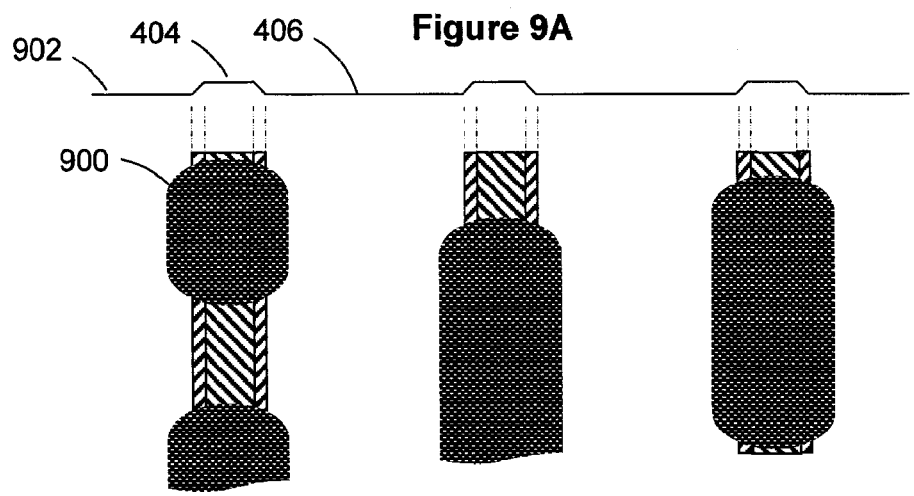
FIGS. 9A, 9B and 9C illustrate various embodiments of the groove geometry and the marks after recording.
Figure 9B:
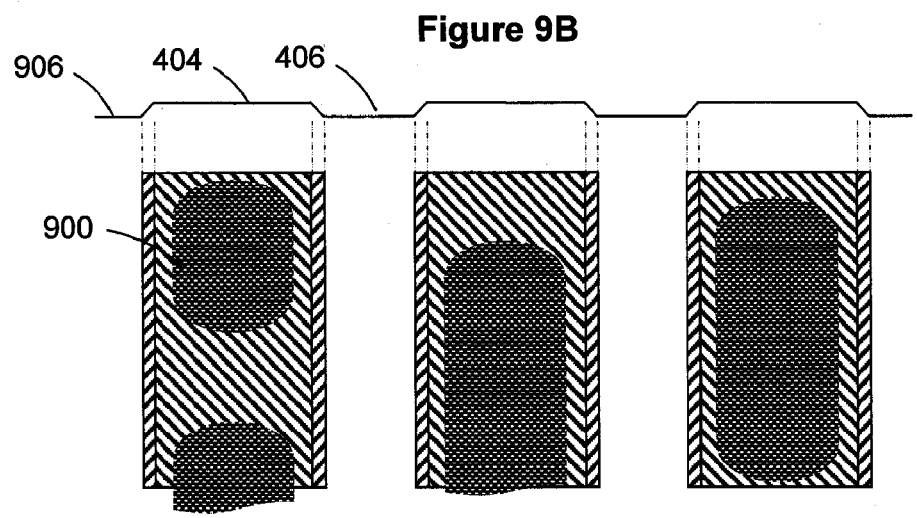
Figure 9C:
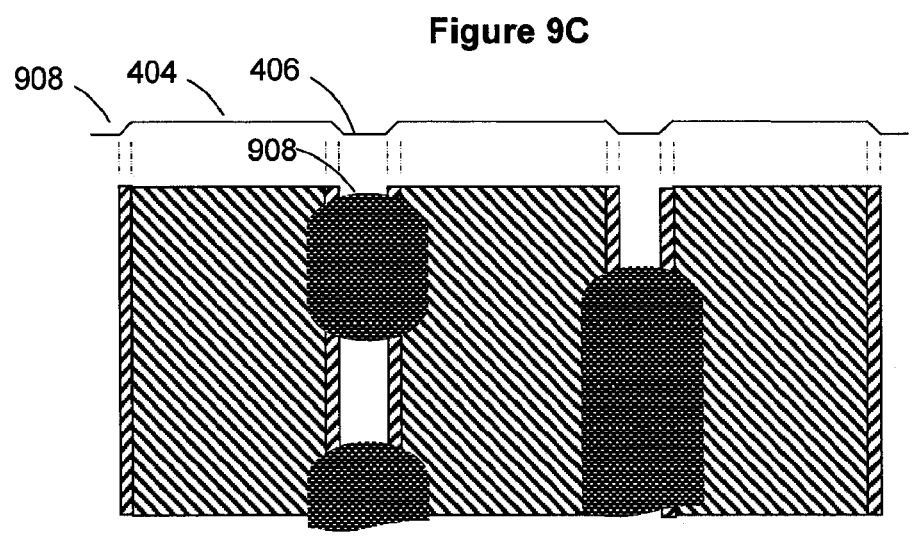

In FIG. 8B, the two axes 800, 803 of the emitted and reflected light beam (as shown by ray tracings 850 and 860, respectively) from the two wavelengths are normally incident to the recording layer, but laterally offset with respect to each other. FIG. 8C illustrates various laser spot 805, 807 spacing that are possible for a single lens system of FIG. 2. The dual lens system of FIG. 3 will have the laser spots 805, 807 located further apart and the axes 800 and 803 of the two wavelengths will have normal incidence on the recording layer FIGS. 9A, 9B and 9C represent a detailed view of groove geometries of example embodiments. FIG. 9A illustrates an on groove recording embodiment where the marks 900 are recorded in the land and groove structure 902 on the grooves 404 that are significantly narrower than the lands 406. In the embodiment of FIG. 9B, the marks 900 are recorded in the land and groove structure 906 on the grooves 404 that are significantly wider than the lands 406. In the embodiment of FIG. 9C, the lands 406 are significantly narrower than the grooves 404. The above examples illustrate different embodiments with different geometries, each geometry causing varying push-pull amplitudes by different wavelengths. Also, different groove geometries can be flexibility used to increase reflectivity and/or improve jitter. In one embodiment, the groove depths, widths and recorded marks are selected to cause the push-pull signal generated by the first wavelength for the recorded disc to be less than 20%.

Figure 10A:
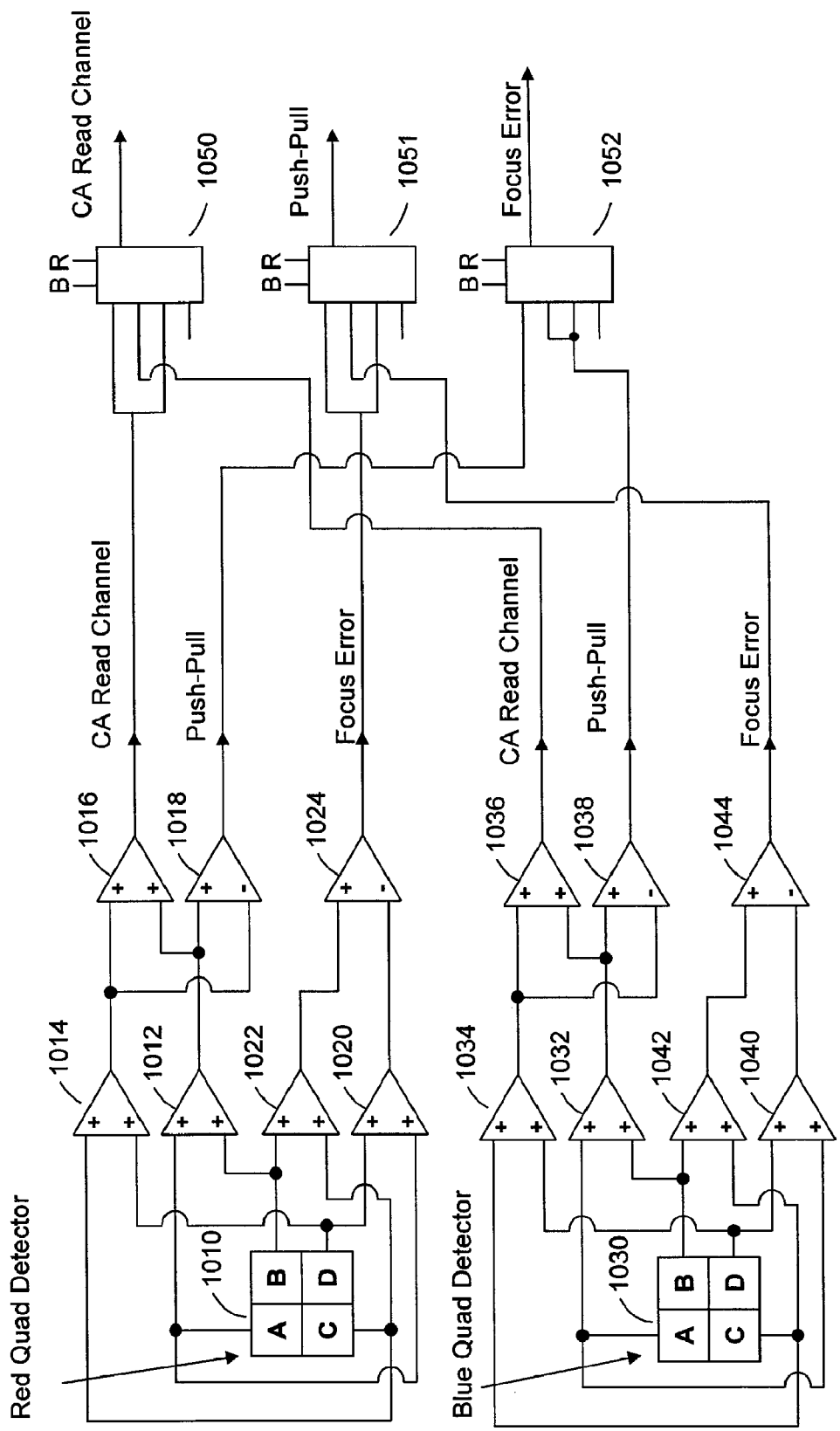

FIG. 10A illustrates the various read signals of one embodiment that can be derived from the four quadrant photo-detector 1010 for the first wavelength and the four quadrant photo-detector 1030 for the second wavelength, each consisting of four individual detectors A, B, C, and D. The electrical signals from quadrants A and B, $I_A$ and $I_B$, are combined in summing amplifier 1012 and 1032 for each wavelength. The signals from quadrants C and D, $I_C$ and $I_D$, are combined in summing amplifier 1014 and 1032 for each wavelength. The outputs of the summing amplifiers 1012 and 1014 are then combined together in summing amplifier 1016 and difference amplifier 1018 to create the central aperture data read (CA) signal and the push-pull (PP) signal respectively for the first wavelength. The signals $I_A$ and $I_D$ are also combined together in summing amplifier 1020, while the signals $I_B$ and $I_C$ are combined in summing amplifier 1022 for the first wavelength.

Next, the outputs of summing amplifiers 1020 and 1022 are combined in difference amplifiers 1024 for to create a signal suitable for the focus error signal (FES) according to later signal conditioning. Similarly, the outputs of the summing amplifiers 1032 and 1034 are then combined together in summing amplifier 1036 and difference amplifier 1038 to create the central aperture data read (CA) signal and the push-pull (PP) signal respectively for the second wavelength. Also, the signals $I_A$ and $I_D$ are also combined together in summing amplifier 1040, while the signals $I_B$ and $I_C$ are combined in summing amplifier 1042 for the first wavelength. Next, the outputs of summing amplifiers 1040 and 1042 are combined in difference amplifiers 1044 for to create a signal suitable for the focus error signal (FES) according to later signal conditioning.

A strong push-pull signal is important for recordable drives because it helps maintain tracking while writing. In contrast, for certain copy protected removable storage medium, once the media has been recorded, a weak push pull signal is preferred so it can be read by another drive that uses laser optics with a different wavelength than the wavelength used for tracking in the recording drive 126, such as drive 150 of FIG. 1A.

For operation with media designed specifically for one wavelength, such as DVD-R, DVD+R, HD DVD or BD-R, signals generated from the specified photo-detectors 1010 or 1030 are used according to the disc in the system. However, in one embodiment with disc 100, a mixture of signals from the two photo-detectors 1020 and 1030 are used. Specifically, the push-pull signal generated by the second wavelength photo-detectors 1019 is used for radial tracking. In this embodiment, a recording system includes signal selection circuitry 1050, 1051, and 1052, such as analog multiplexers, to select the appropriate central aperture, push-pull and focus signals according to the type and recording state of media in the system.

FIG. 10B illustrates the various signal selections for an example embodiment. The "B" represents blue and "R" represents red signals for the signal selector inputs for 4:1 analog multiplexers 1050, 1051, and 1052. For one embodiment of a standard DVD type disc, "R" is on and "B" is off selecting the outputs of summing or differencing amplifiers 1016, 1018 and 1024 for use by the optical system controller 114 and servo processing 112 functions of drive 126 of FIG. 1A. Similarly, in another embodiment for a standard blue laser disc, such as Blu-ray or HD DVD, "R" is off and "B" is on selecting the outputs of summing or differencing amplifiers 1036, 1038 and 1044 for use by the optical system controller 114 and servo processing 112 functions of drive 126 of FIG. 1A. In one embodiment, for disc 100, both "B" and "R" are on and the outputs from summing or differencing amplifiers 1016, 1038 and 1024 for use by the optical system controller 114 and servo processing 112 functions of drive 126 of FIG. 1A. For this example embodiment, the focus error signal generated from the difference amplifier 1044 could also be used for the case of "B" and "R" turned on.

In one embodiment, the CA read signal is used to read the data and to normalize the push-pull signal or other signals derived from the photo-detectors. It should be noted that other embodiments with varying designs and component orientations, including different photo-detector designs and interface circuitry are within the scope of the present invention. Additional signal conditioning functions may also be applied to make the signals more usable by the optical system controller 114 and servo processing 112 functions of FIG. 1A.

FIG. 10C provides a chart illustrating further details for the power output of laser diodes 201 and 200 of FIG. 2 or 3 for the various types of discs that can be inserted into drive 100 of FIG. 1A in one embodiment. This chart illustrates the power output for two wavelengths, such as red and blue, for read or write operations for various disc types.

Figure 11:
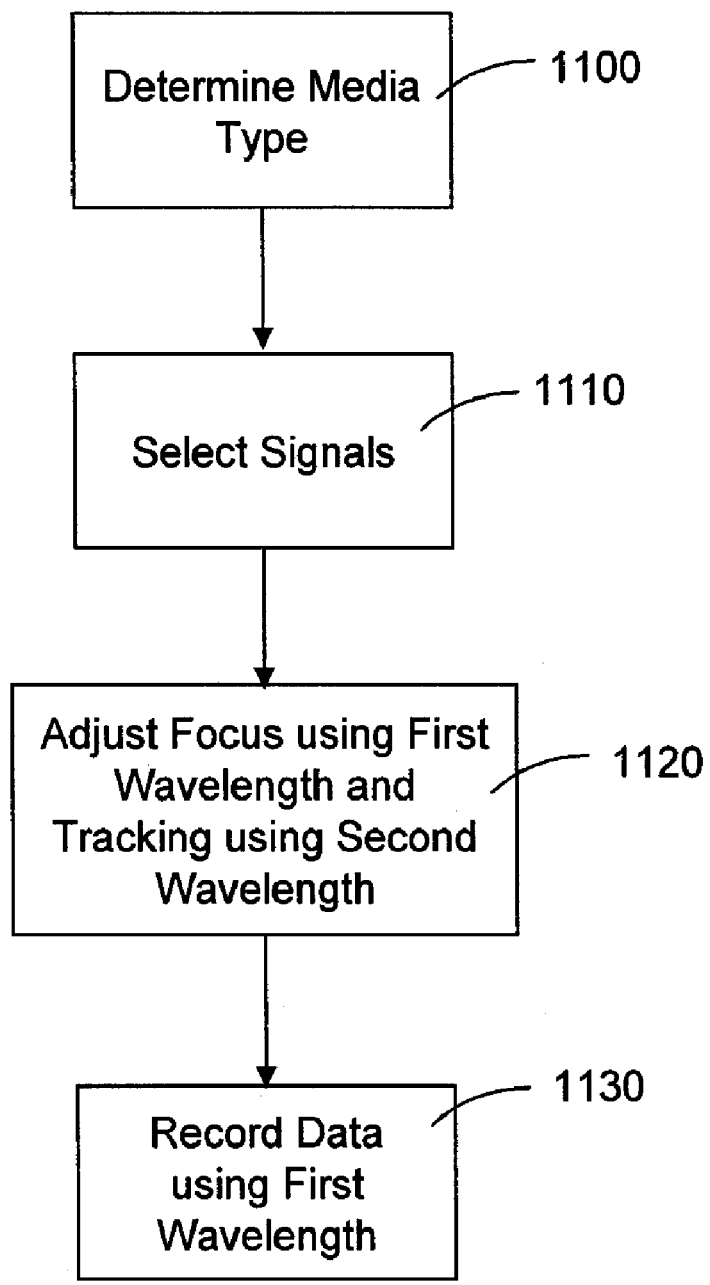
FIG. 11 illustrates an example flow chart of one embodiment for recording the media.

The flow chart in FIG. 11 illustrates an example method for recording the media in one embodiment. In step 1100, the drive 126 of FIG. 1A determines the type of media. In step 1110, the appropriate signals are selected for recording. In step 1120, the drive will adjust focus using the first wavelength and tracking using the second wavelength. In step 1130, when the first wavelength optical recording spot 805 of FIG. 8 has reached the correct location using the second wavelength reading spot 807 of FIG. 8, the first wavelength laser diode is modulated at high power to create the data marks and space.

The foregoing has described the principles, embodiments and modes of operation of the present invention. However, the invention should not be construed as being limited to the particular embodiments discussed. The above-described embodiments should be regarded as illustrative rather than restrictive, and it should be appreciated that variations may be made in those embodiments by workers skilled in the art without departing from the scope of the present invention as defined by the following claims. For example, the teachings provided herein are applicable to computer systems as well as stand-alone storage devices such as optical disc video recorders.

What is claimed is:

1. A method for storing computer readable data on a removable storage medium, comprising:
   using a first wavelength to write data to the removable storage medium;
   using a second wavelength to maintain radial tracking on the removable storage medium, wherein the second wavelength is shorter than the first wavelength; and
   maintaining axial tracking on the removable storage medium with at least one of the first wavelength or the second wavelength;
   wherein radial tracking is maintained by a low power blue laser;
   wherein axial tracking is maintained by a red laser to ensure optimal writing of a laser spot and wherein spots created by the blue and red lasers are directly coupled; and
   further comprising using a dual objective lens and mechanically and electrically controlling the blue and red lasers.

2. The method of claim 1, wherein radial tracking is maintained by a high power laser diode in low power mode.

3. The method of claim 1, further comprising making the blue laser spot and the red laser spot radially and tangentially coincident on the removable storage medium.

4. The method of claim 1, further comprising using a single detector for two different reflected spots created by the blue and red lasers.

5. The method of claim 1, further comprising using a first detector for reflected spots created by the blue laser and a second detector for reflected spots created by the red laser.

6. The method of claim 1, selecting a groove geometry with an optimal set of values for reflectivity, jitter and push-pull signal.

7. The method of claim 1, wherein maintaining comprises using the second wavelength to read information encoded on a physical structure containing at least one groove of the removable storage medium.

8. The method of claim 7, wherein information in the physical structure of the removable storage medium is encoded by deviations in the groove.

9. The method of claim 7, wherein the information in the physical structure of the removable storage medium is encoded in pre-pits adjacent to the groove.

10. The method of claim 1, further comprising selecting a radial tracking signal from one of the first wavelength or the second wavelength.

11. The method of claim 1, further comprising routing signals from plural photo-detectors according to a disc type.

12. The method of claim 1, further comprising controlling laser power for the first and second wavelengths.

13. The method of claim 12, further comprising writing to the storage medium with the laser power of the first wavelength and reading from the storage medium with the laser power of the second wavelength.

14. A method for storing computer readable data on a removable storage medium, comprising:
   modulating a first wavelength to create marks and spaces on the removable storage medium; and
   maintaining radial tracking on the removable storage medium with a second wavelength, different from the first wavelength, wherein maintaining radial tracking is performed concurrently with modulating the first wavelength;
   using a dual objective lens and mechanically and electrically controlling red and blue lasers respectively providing the first and second wavelengths.

15. The method of claim 14, wherein maintaining comprises using the second wavelength to maintain tangential tracking on the removable storage medium.

16. The method of claim 14, wherein maintaining comprises using the second wavelength to control modulating the first wavelength when writing to the removable storage medium.

17. A recording device for storing computer readable data on a removable storage medium, comprising:
   laser optics with a first wavelength configured to generate marks and spaces in the removable storage medium; and
   laser optics with a second wavelength, which is shorter than the first wavelength, configured to maintain radial tracking on the removable storage medium;
   wherein laser optics for the first wavelength uses a red laser that has a wavelength of one of from 630 to 680 nanometers;
   wherein laser optics for the second wavelength uses a blue-violet laser that has a wavelength of one of 400 to 420 nanometers;
   wherein the first wavelength creates a predetermined weak push-pull signal when read by a red laser and a predetermined strong push-pull signal when read by a blue-violet laser; and
   wherein the weak push-pull signal is less than 15% of a predetermined amount and the strong push-pull signal is greater than 20% of the predetermined amount.

18. The recording device of claim 17, further comprising a selection device configured to select a radial tracking signal from one of the first wavelength or the second wavelength.

19. The recording device of claim 18, wherein the selection device is further configured to route signals from plural photo-detectors according to disc type.

20. The recording device of claim 17, further comprising a selection device configured to control laser power for the first and second wavelengths.

21. The recording device of claim 20, wherein the laser power for the first wavelength is configured to write to the storage medium and the laser power for the second wavelength is configured to read the storage medium.

22. A removable recordable optical media for storing computer readable data, comprising:
- a disc shaped structure having a spiral groove structure located over at least a portion of a radius of the disc shaped structure;
- wherein the spiral groove structure has a groove depth configured to cause a strong push-pull signal from a first wavelength and a weak push-pull signal from a second wavelength different than the first wavelength;
- wherein the weak push-pull signal is less than 15% of a predetermined amount and the strong push-pull signal is greater than 20% of the predetermined amount.

23. The removable recordable optical media of claim 22, wherein the disc shaped structure contains a recordable layer.

24. The removable recordable optical media of claim 23, wherein the recordable layer is configured to be more sensitive to laser light of the first wavelength than laser light of the second wavelength.

25. The removable recordable optical media of claim 22, wherein the first wavelength is configured to write data and the second wavelength is configured to maintain radial and axial tracking.

26. The removable recordable optical media of claim 25, wherein the first wavelength uses a red laser that has a wavelength of one of from 630 to 680 nanometers and the second wavelength uses a blue-violet laser that has a wavelength of one of 400 to 420 nanometers.

* * * * *